April 19, 1949.  R. J. WHITE  2,467,795
AIRCRAFT CONTROL
Filed Dec. 6, 1944  2 Sheets-Sheet 2
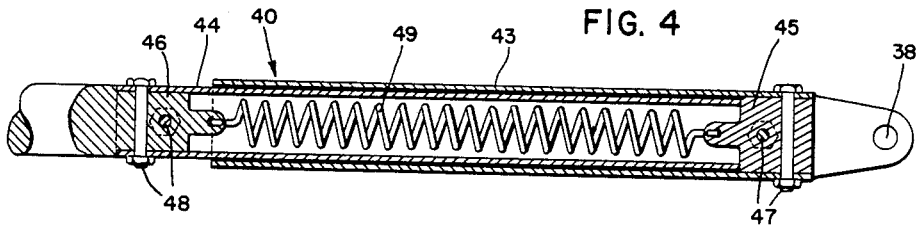
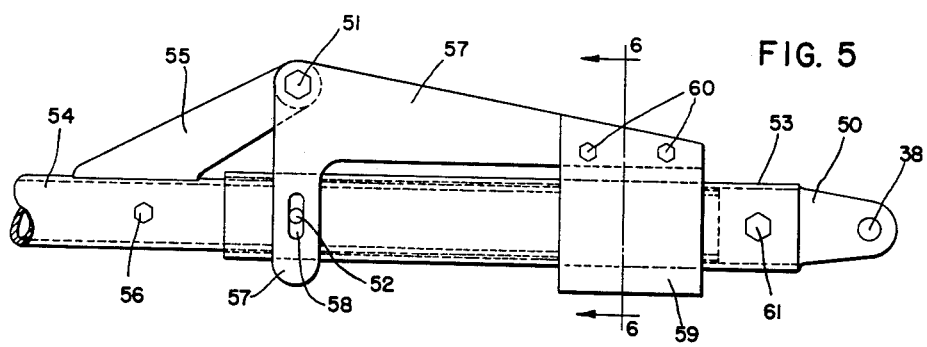
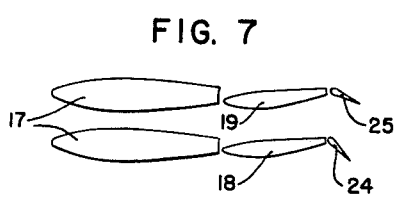
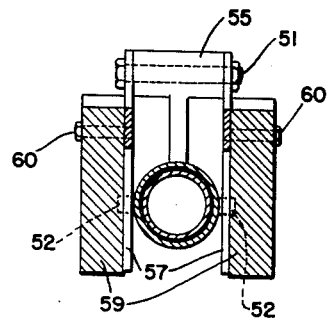
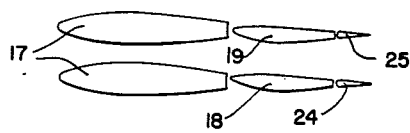
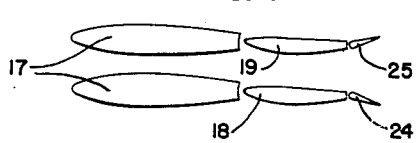
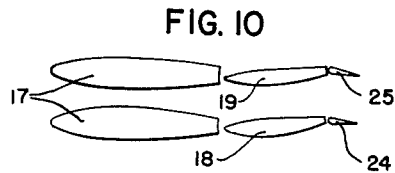
INVENTOR.
ROLAND J. WHITE
BY George F. Goodyear
ATTORNEY Patented Apr. 19, 1949

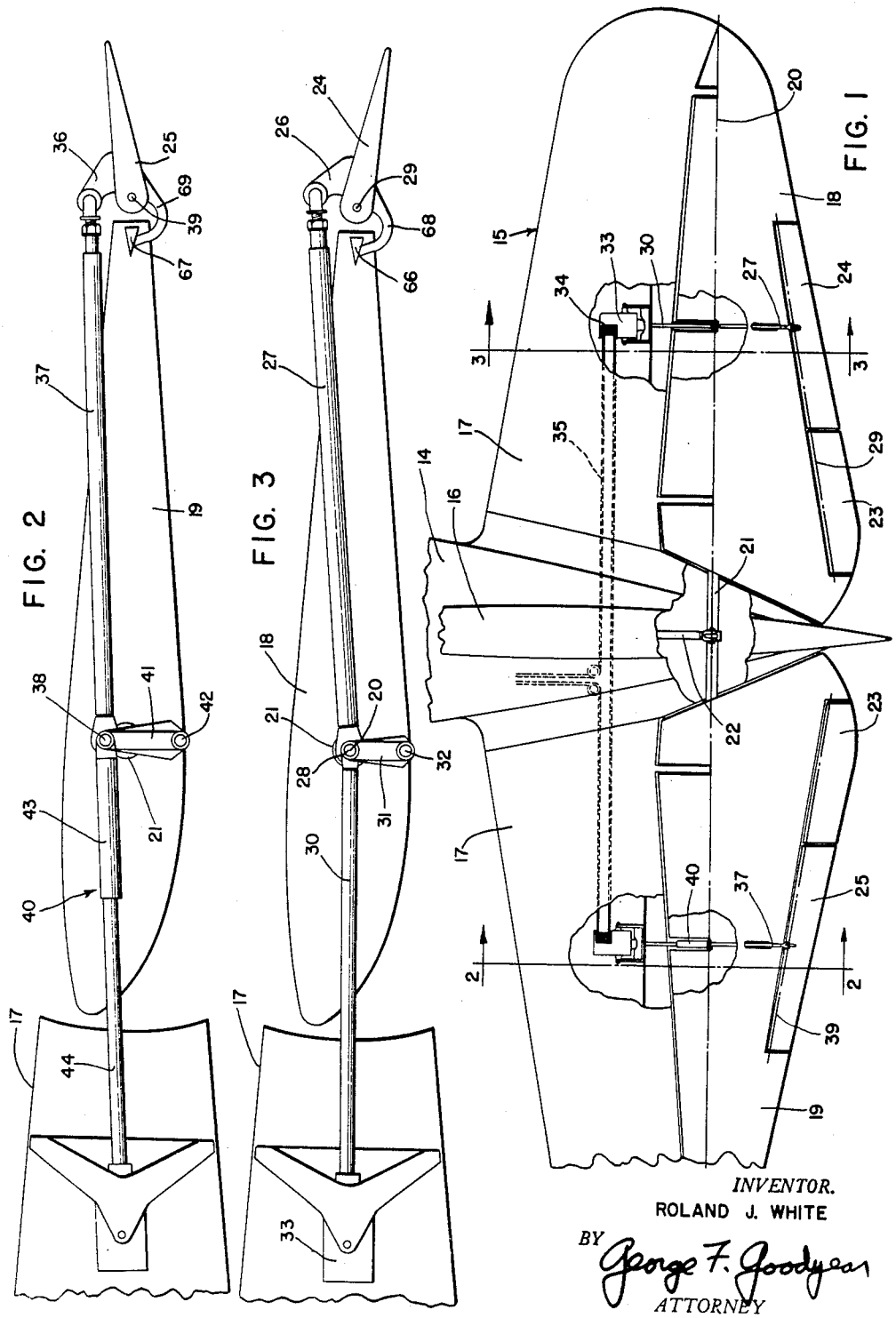

2,467,795

UNITED STATES PATENT OFFICE 2,467,795

AIRCRAFT CONTROL

Roland J. White, Clayton, Mo., assignor to Curtiss-Wright Corporation, a corporation of Delaware Application December 6, 1944, Serial No. 566,835

23 Claims. (Cl. 244—82)

This invention relates to aircraft control. More particularly, it relates to improvements in the longitudinal stability and control of aircraft.

In the art of aircraft design, it is known that the stability of an airplane may generally be improved by statically unbalancing the elevator so that its trailing edge tends to drop. With this arrangement, the aerodynamic loads on the elevator, when the airplane is in normal flight, oppose the static unbalance forces, to form a proper equilibrium position of the elevator. As a result, the center of gravity of the airplane may be located at a further aft position, without encountering a reversal of the forces applied to the control stick to keep the airplane in normal level flight, thereby improving the utility and stability of the airplane. The elevator may be statically unbalanced in several different ways: (a) mass unbalance, by construction of the elevator so that its center of gravity is located aft of its hinge line or by providing a weight attached to the elevator or its torque tube and located in the fuselage aft of the elevator hinge line; or (b) spring unbalance, such as by means of a "downspring," incorporated in the elevator control mechanism, to pull the elevator in a downward direction. These devices in the past have been effective in increasing the stability of the airplane by a small amount, but their use has been limited generally by the bothersome load that the pilot must exert while taxiing the airplane on the ground and, in the case of mass unbalance, by the elevator flutter tendency. These characteristics limit the amount of the static unbalance that may be employed, and as a result only 4 or 5% increase in the airplane static stability may generally be obtained.

It is therefore an object of this invention to provide an improved means for substantially statically unbalancing the elevator or other movable longitudinal control surface of an airplane. It is another object to provide such a means in which the maximum control forces required to operate the elevator during normal flight are not increased over those which would occur when the present invention is not employed. It is a further object to provide such a means in which the control forces required to operate the elevator during taxiing or other maneuvers on the ground are reduced to a minimum. A still further object is to provide means for permitting the center of gravity of an airplane to be located at a position considerably to the rearward of its normal position, without causing a reversal of the direction of the pilot control forces. Other objects will appear hereinafter.

These objects are accomplished, according to the present invention, by means of a force acting within the airplane to produce an angular deflection to one of a pair of auxiliary control airfoils situated at the trailing edge of a movable longitudinal control surface, particularly an elevator. The right and left portions of the elevator are interconnected in normal fashion, and the right and left auxiliary control airfoils are also interconnected in normal fashion, but with a separate force applied to angularly deflect one of the two auxiliary control airfoils with respect to the other auxiliary control airfoil. For the sake of convenience, the pilot-controlled auxiliary airfoil will be referred to hereinafter as a trim tab, while the separately deflectable auxiliary airfoil will be referred to as a stability tab.

In the drawings: Figure 1 is a top plan view, with parts broken away for convenience in illustration, of an airplane empennage embodying the features of the present invention; Figures 2 and 3 are views taken along the line 2—2 and 3—3, respectively, of Figure 1; Figure 4 is a side view, partly in cross section, of one means for applying an upward force to the stability tab; Figure 5 is a side view of an alternative means for applying an upward force to the stability tab; Figure 6 is a section taken along the line 6—6 of Figure 5; Figures 7, 8, 9 and 10 are diagrammatic views of the relative settings of the horizontal stabilizer, elevator and auxiliary control airfoils under different flight and airplane center of gravity conditions, Figure 7 illustrating forward center of gravity conditions, Figure 8 illustrating aft center of gravity high speed conditions, Figure 9 illustrating aft center of gravity low speed conditions, and Figure 10 illustrating high acceleration constant speed conditions.

Referring now to Figure 1 of the drawings, an airplane empennage indicated generally at 15 includes a vertical surface 16 and right and left fixed horizontal stabilizers 17 attached to the fuselage 14. At the trailing edge of stabilizers 17 there are attached, in conventional fashion, right and left elevator sections 18 and 19, respectively, mounted to rotate about a laterally extending axis 20. The two elevator sections 18 and 19 are connected to rotate in unison by means of a torque tube 21 coaxial with axis 20, this torque tube being operated in any conventional fashion such as by means of a push-pull rod 22, so that the two sections may be considered as together constituting a single elevator or longitudinal control airfoil. At the trailing edge of the elevator sections 18 and 19 are disposed a pair of tabs 23 which may be omitted if desired, and do not constitute any part of the present invention.

Also mounted at the trailing edge of elevator sections 18 and 19, and outboard of the tabs 23, are a second pair of tabs 24 and 25 respectively, mounted for rotation about pivot axes 29 and 39 respectively. On the right hand tab 24 (the trim tab, see Figure 3) is mounted a conventional horn 26 to which is pivotally attached a push-pull rod 27. The forward end of rod 27 is in turn pivotally attached as shown at 28 at or near the axis of rotation 20 of the elevator section 18, to a second push-pull rod 30 and to a link 31. The link 31 is pivotally attached to the elevator, at or near its lower surface, as shown at 32. The rod 30 is provided at its forward end with any suitable mechanism 33 for moving the rod in a fore and aft direction. Such a mechanism, for example, may comprise a rotatable drum 34 (Figure 1) rotated by means of a cable 35 controlled by the pilot. The drum is connected to rod 30, and moves the rod in a fore and aft direction when it is rotated, such as by the provision of a screw threaded end (not shown) which, as is normal in trim tab adjusting mechanisms, provides an irreversible or self-locking connection so that aerodynamic forces upon the tabs cannot disturb the trim adjustment. It will be understood that the push-pull rod 27 and 30 constitute a substantially unyielding connection between the tab adjusting or operating means 33, 34, 35 and the tab 24, in the sense that no means for intentionally elongating or contracting them is provided.

The tab 25 (the stability tab, see Figure 2) is also provided with a conventional horn 36 to which is pivotally attached a push-pull rod 37. The forward end of rod 37 is in turn pivotally attached as shown at 38, at a point somewhat above the axis of rotation 20 of the elevator section 19, to a link 41 and to a resilient or expandable push-pull element indicated generally at 40. The link 41 is pivotally attached to the elevator section 19, at or near its lower surface, as shown at 42. The push-pull element 40 is connected to the cable 35, for fore and aft movement thereby, as in the case of push-pull rod 30.

Referring now to Figures 2 and 3, it will be seen that rotation of the elevator section 18 about its axis 20 will have little if any effect on the setting of the trim tab 24 with respect to the elevator, if the axis 28 is at or near the axis 20. Due to the shortness of the horn 26 with respect to the length of push-pull rod 27, axis 28 never becomes very far removed from axis 20 and any displacement that does occur is substantially in line with the axis of rod 27. In the case of elevator section 19, however, the location of axis 38 above axis 20 causes the stability tab 25 to turn in the opposite sense, with respect to the elevator, as the elevator turns with respect to the fixed stabilizer, assuming that element 40 neither expands nor contracts. The distance of axis 38 above axis 20 may conveniently be such as to accomplish a ½ to 1 balance ratio. This will cause the stability tab 25 to turn at one-half the rate of turn of the elevator section 19, for reasons hereinafter described. As horn 36 is relatively short with respect to the length of push-pull rod 37, this turn ratio will remain substantially constant throughout the effective range of movement of stability tab 25.

As shown in Figures 2 and 3, trim tab 24 under static conditions is set in a downward direction, while stability tab 25 under static conditions is deflected in an upward direction. As long as the load on resilient or expandable push-pull rod 40 remains less than a specific value, these relative positions of the two tabs i. e. the difference in their angles of incidence relative to the elevator, will remain comparatively unaffected. Adjustment by means of control cable 35 will cause equal fore and aft movements of the rods 30 and 40, and thus equal deflections of the tabs 24 and 25. In any position of trim adjustment of the two tabs movement of the stability tab 25 to lessen the difference between the angles of incidence of the tabs, will, by the tab effect on the hinged elevator, tend to decrease the negative pitching moments (diving moments) on the airplane. For certain airplane maneuvers the tab deflection from the chord line of the elevator should be approximately equal but in opposite directions therefrom. In the form shown, the angle of deflection is about 10 degrees in each case. Under these conditions, the forces exerted by the two tabs will approximately neutralize each other.

Referring now to Figures 2 and 4, the push-pull element 40 includes two telescoping sections 43 and 44, provided with fittings 45 and 46, respectively. These fittings are held in place by means of bolts 47 and 48, respectively, on their respective sections. The forward end of fitting 45 forms a stop for inner section 44, to limit the movement thereof. A tension spring 49, with its ends hooked into fittings 45 and 46, urges section 44 to telescope within section 43, that is, it tends to shorten the length of push-pull element 40. The arrangement shown in Figure 4 may conveniently be termed a tab up-spring, and it will be seen that it constitutes a yieldable connection, yieldable in only one direction from its fully contracted condition, between the tab operating means and the tab 25.

The mechanism illustrated in Figures 5 and 6 may be used in place of that shown in Figure 4, or the two mechanisms may be combined into a single mechanism. In this mechanism, two telescoping sections 53 and 54 are provided as before, telescoping movement being limited by abutment of the end of inner section 54 against the end fitting 50 of section 53, this fitting being held in place by means of bolt 61. The inner section 54 is furnished with a radially extending arm 55 affixed thereto by means of bolt 56. To the outer end of the arm 55 is pivotally attached, as shown, at 51, a double yoke 57, whose lower arms are provided with slots 58 in which ride pins 52 affixed to outer section 53. The remaining two arms of the yoke 57 are provided with a pair of depending weights 59 affixed thereto by means of bolts 60. The outer section 53 is pivotally attached to the remainder of the mechanism at 38, as shown in Figure 2. When a force is applied to sections 53 and 54 such as to tend to pull the sections apart, it will be seen that yoke 57 is forced to rotate in a counter-clockwise direction, by the action of pins 52. This motion is opposed by the weights 59. The arrangement shown in Figures 5 and 6 may conveniently be termed a tab mass overbalance.

Since the stability tab 25 is resiliently mounted, it is desirable to employ balance weights 67 which are mounted on horns 69 extending forward of the leading edge of the tab and through suitable openings into the interior of the elevator structure. This expedient assists in preventing flutter, according to well-known structural principles. Analogous weights 66 and horns 68 may be employed on trim tab 24, although this is not necessary in view of the fact that tab 24 is rigidly connected to the control mechanism. The tabs may thus be dynamically balanced with respect to elevator movement. A number of these weights may be distributed along the span-wise extent of the tabs, at suitable intervals as desired.

Having described the structure generally, a detailed description of its method of use in the operation of an airplane will now be given. With the positions of tabs 24 and 25 as shown in Figures 2 and 3, it is preferred that the trim tab position indicator in the airplane cockpit be calibrated to read zero. For this arrangement the net aerodynamic trim moments acting on the elevator by reason of the tabs will be zero, as the forces from the opposed tabs will balance each other. Tab 24 is connected to operate as a trim tab and will be displaced only when the trim motor is operated. This tab may, if so desired, be arranged to move with respect to the elevator, when the elevator is moved, by proper location of the axis 28 with respect to axis 20, in which case tab 24 will have a combined trim and balance or anti-balance action. For present purposes, however, tab 24 will be considered only a trim tab. The extendable push-pull element 40 is normally held in a retracted position by the spring 49 or weight 59. However, when the air forces on stability tab 25 exceed a certain value the push-pull element 40 will extend causing the stability tab 25 to reduce its up rigged angle. After the inner telescoping section of element 40 is unseated from its stop, the stability tab will float free and will be in equilibrium, due to the air forces on the tab and the tab moment produced by the up-spring or over-balance. Whenever the airspeed is changed, the stability tab will change position to maintain its equilibrium.

The angle at which stability tab 25 is rigged up, with respect to trim tab 24, depends upon the size of the tabs and the amount of stability to be obtained by the practice of this invention. As stated previously, the stability tab may be rigged up 10 degrees when the trim tab is rigged down 10 degrees, giving a relative angle of 20 degrees, but this relative angle may be greater or less, such as 25 degrees, to secure a given amount of stability improvement. Again, the loading of the up-spring or over-balance in push-pull element 40 should be carefully predetermined to counteract aerodynamic loads on the stability tab, causing it to float or deflect downwardly under conditions and at speeds necessary to secure the desired stability. The up-spring or over-balance loading will thus also depend upon the size of the tabs and the amount of stability to be obtained. It is preferred that the up-spring have a small spring rate so that it will produce essentially a constant force during the extension of the push-pull element 40. In this case the amount of stability added to the airplane will be constant at all airspeeds.

In the practice of this invention, the airplane is of course operated under several different conditions. The action of the stability tab under such conditions may be described as follows, these conditions including the principal conditions under which the airplane is operated.

1. When the airplane is flown with its center of gravity in a forward position, the pilot will trim the elevator upwardly by deflecting trim tab 24 downwardly. In this position, stability tab 25 will be maintained at an angle 20 degrees above trim tab 24, with push-pull element in contracted position (i. e. section 44 abutting against stop 45, Figure 4; or section 54 abutting against stop 50, Figure 5). In this case, the airplane will operate as if two fixed trim tabs are used, which is desired as no stability improvement during flight is required for forward center of gravity locations. When the pilot uses full down trim, if such is necessary, the stability tab 25 will be deflected down 10 degrees, while trim tab 24 will be deflected down 30 degrees. With this arrangement, high control forces for forward center of gravity conditions, as customarily occurs with a mass unbalanced or spring unbalanced elevator, are no longer present. With the tabs 24 and 25 in this position, aerodynamic forces do not counterbalance the up-spring or mass over-balance of stability tab 25, but operate in the same direction. Consequently, the stability tab is at all times held rigid against the stop in push-pull element 40. This condition is illustrated diagrammatically in Figure 7 of the drawings.

2. Let it be considered, now, that the airplane is operating at a rearward center of gravity position, such that little or no elevator trim is required, at relatively high airspeeds. For this condition, trim tab 24 will be in an approximately neutral position. At the same time, aerodynamic forces during flight will deflect the stability tab 25 downwardly, elongating push-pull element 40 against its up-spring or over-balance. In this position, the stability tab is said to "float" against the spring or weight to an approximately horizontal or neutral position. In this trim condition, should the air speed decrease, the stability tab 25 will have its air load reduced and as a result will deflect upwardly, causing a downward deflection of the elevator in a manner similar to that of a statically unbalanced elevator. Conversely, as the airspeed is increased, the upward deflection of the stability tab will be automatically reduced. By this arrangement, it will be seen that movement of the elevator is accomplished automatically as the speed changes, with no adjustment of the trim tab 24 required by the pilot. This condition is illustrated diagrammatically in Figure 8 of the drawings.

3. When flying an airplane with rearward center of gravity at low speed, and during take-off and landing (e. g. at speeds below 100 miles per hour on the type of airplane to which the invention was first applied), the aerodynamic loads on the stability tab are not sufficient to overcome the preload force of the up-spring or over-balance in the push-pull element 40, irrespective of the location of the center of gravity. The force of the up-spring or over-balance, in fact, is preselected to secure this effect. The same effect is secured when the airplane is being maneuvered on the ground, including take-off and landing maneuvers. Under these conditions the push-pull element 40 will be fully contracted and the inner telescoping section 44 or 54 will abut against the stop 45 or 50, respectively. Thus for these conditions the two tabs 24 and 25 will neutralize each other and no extra control loads will be required for ground handling. This condition is illustrated diagrammatically in Figure 9 of the drawings.

4. When the acceleration of an aeroplane is increasing rapidly without change of speed, such as in certain aerial maneuvers, it is necessary to move the elevator upward from its normal level flight position. Under these conditions the aerodynamic forces acting upon stability tab 25 tend to deflect it downwardly. Due, however, to the arrangement of linkages 37 and 41 and the location of the axis 38 with respect to the axis 20, an upward deflection of the elevator 19 is attended by a downward deflection of the stability tab 25 with respect to the elevator 19. Consequently, it is not necessary to extend push-pull element 40 in order to secure downward deflection of stability tab 25. This arrangement prevents sudden changes in the elevator stiffness during maneuvering flight, which might occur if the stability tab were floating against the up-spring and suddenly contacting the stops in push-pull element 40. This condition is illustrated diagrammatically in Figure 10 of the drawings, and of course only applies when an up-spring is used.

When the up-spring arrangement shown in Figure 4 is employed in the practice of this invention, the stability associated with a change in airspeed is considerably improved. On the other hand, the dynamic characteristics of the airplane may be adversely affected in that the damping of the long period of oscillation (phugoid motion) may be reduced. In addition to this, the stability during maneuvering flight at constant airspeed will not be improved. When the mass overbalancing arrangement shown in Figures 5 and 6 is employed, the stability will be improved for both accelerated and unaccelerated flight. Furthermore, while the long period of oscillation of the airplane will have its damping reduced, it will not, in general, be reduced as much as in the case of the spring arrangement. If too much mass over-balance is used there may be a tendency for the controls to be rougher with this type of balance than with the up-spring type when the airplane encounters rough air. It therefore may be desired to use both an up-spring and mass over-balance on the stability tab. In fact, if the damping of the long period oscillation of the airplane is to be improved the spring action applied to the tab may be reversed, that is a tab down-spring may be used. This will improve the damping of the long period oscillation of the airplane but will produce a loss in the airplane stability. To compensate for this loss in stability a large amount of mass overbalance of the stability tab may be provided in combination with a reversed spring or downspring on the stability tab, which will make the airplane have both an increased stability and improved damping characteristics of the long period oscillation. It is apparent that the combination of mass over-balance of the tab and tab up or down-spring will depend upon the design characteristics of the airplane.

Recently flight tests were made on a large transport airplane in which an ordinary elevator down-spring and the present invention in the form of a tab up-spring were tested and compared. The elevator down-spring provided a pilot control force of 54 pounds when the airplane was on the ground and improved the stability neutral point of the airplane by only 4%. When this invention was installed and flight tested the airplane stability neutral point was increased rearwardly by 16% without altering the control forces at the most forward center of gravity position, or altering the control loads during taxiing on the ground. Had an elevator down-spring been used to provide this same effect the pilot would have had a control force of 200 lbs. during the taxi period on the ground which is much more than he would want to handle. Further, during the flight of the airplane with the stability tab no lag or roughness of control forces were felt in maneuvering flight and, as a result, its performance was regarded as very satisfactory.

It will be noted that the stability tab in the embodiment of the invention described above is located on the left side of the elevator. The trim tab and the stability tab may, however, be interchanged, if desired, or located on the same side of the elevator without affecting the utility of the present invention. The direction of rotation of the airplane propeller and the airstream from the propeller appear to have little effect on the desired location of the stability tab. The stability tab may likewise be employed with movable longitudinal control surfaces located at places other than the tail of the airplane, such as on elevators at the nose of the airplane or on the ailerons in the case of a tailless airplane which uses the ailerons for longitudinal control and where the ailerons are therefore considered to constitute an elevator or longitudinal control airfoil. In the case of a nose elevator, the static unbalance of the stability tab should be applied in a downward direction, since in this case elevator movement operates in a reverse direction. In the case of tabs on the ailerons or aileron-elevators, both stability and trim tabs may be located on a single aileron, with a similar set on the opposite aileron. Many other modifications are possible without departing from the spirit of the invention, and it is not intended to be limited, except as defined in the appended claims.

I claim:

1. In combination with an aircraft elevator, a pair of auxiliary control airfoils disposed at the trailing edge of said elevator, adjustable control means for said auxiliary airfoils, first linkage means consisting of links of fixed length connecting one said auxiliary airfoil to said adjustable control means, and second linkage means including a variable length link connecting the other said auxiliary airfoil to said adjustable control means, a load applying means for contracting and opposing the expansion of said variable length link thereby tending to maintain its associated auxiliary airfoil upwardly deflected with respect to the auxiliary airfoil connected to said first linkage means, stop means limiting the contraction of said variable length link, said second linkage means being arranged to deflect said variably connected auxiliary airfoil downwardly with respect to said elevator when said elevator is deflected upwardly with respect to said aircraft.

2. In combination with an airplane having an elevator structure hinged thereto for providing longitudinal control, a tab hingedly mounted on a traling edge portion of the elevator structure, trim adjusting means having a connection with the tab for adjusting the latter about its hinge axis for longitudinal trimming of the airplane, said connection between the tab and the adjusting means therefor including load applying means arranged to provide for yielding of the connection in only one direction to enable air pressures on the tab to move the latter about its hinge axis in one direction but not in the opposite direction from its adjusted position, and said load applying means to prevent yielding of said connection in said one direction in response to air pressures on the tab of less than a predetermined value.

3. In combination with an airplane having an elevator structure hinged thereto for providing longitudinal control, a tab hingedly mounted on a trailing edge portion of the elevator structure, trim adjusting means having a connection with the tab for adjusting the latter about its hinge axis for longitudinal trimming of the airplane, said connection between the adjusting means and the tab including a preloaded spring arranged to provide for yielding of the connection in one direction only, such yielding, which occurs when the load on the connection exceeds the preloading of the spring, providing for movement of the tab about its hinge axis in one direction only from its adjusted position by the action of air pressure upon it.

4. In combination with an airplane having an elevator structure hinged thereto for providing longitudinal control, a tab hingedly mounted on a trailing edge portion of the elevator structure, trim adjusting means having a connection with the tab for adjusting the latter about its hinge axis for longitudinal trimming of the airplane, said connection between the adjusting means and the tab including a weight arranged to provide for yielding of the connection in one direction only and only when the load on said connection exceeds a predetermined value, such yielding providing for movement of the tab by air pressure about its hinge axis in one direction only from its adjusted position.

5. In combination with an airplane having an elevator structure hinged thereto for providing longitudinal control, a tab hingedly mounted on a trailing edge portion of the elevator structure, trim adjusting means having a connection with the tab for adjusting the latter about its hinge axis for longitudinal trimming of the airplane, the connection including means whereby the tab is moved relative to the elevator structure upon movement of the latter relative to the airplane to provide an aerodynamic balancing effect, and the connection including load applying means arranged to provide for yielding of the connection in one direction only to enable air pressures of more than a predetermined value on the tab to move it about its hinge axis in one direction from its adjusted position.

6. In combination with an airplane having an elevator hinged thereto for providing longitudinal control, a tab hinged for angular movement to a trailing edge portion of the elevator, trim adjusting means connected with the tab for effecting angular movement of it in either direction for adjusting the longitudinal trim of the airplane, the connection between the tab and said trim adjusting means being yieldable in only one direction, to enable aerodynamic forces on the tab to move it angularly, from the position in which it is supported in the absence of such aerodynamic forces, only in the direction which by the tab effect on the elevator will tend to decrease the negative pitching moments upon the airplane, said yieldable connection comprising relatively movable parts having cooperating stop means and elastic means acting between said parts for urging them into the relative limit position thereof established by the stop means, the magnitude of the load applied by said elastic means being such as to prevent said movement of the tab from said supported position thereof by the aerodynamic forces encountered in the lower part of the airspeed range of the airplane when the longitudinal trim of the airplane is adjusted for an aft center of gravity load distribution and being such as to enable said movement of the tab by the increasing aerodynamic forces encountered at higher airspeeds under the same condition of longitudinal trim.

7. In combination with an airplane having a control airfoil hinged thereto for providing longitudinal control, first and second tabs each hinged for independent movement to a trailing edge portion of the control airfoil, operating means connected wtih both tabs for effecting co-directional angular movement of them in either direction for adjusting the longitudinal trim of the airplane, the tabs in the absence of aerodynamic forces thereon being supported at different angles of incidence relative to the control airfoil, the connection between the first tab and said operating means being substantially unyielding, the connection between the second tab and said operating means being yieldable to enable aerodynamic forces on the second tab to move it angularly from said supported position thereof to lessen the difference between said angles of incidence of the tabs and, by the tab effect on said control airfoil, to tend to decrease the negative pitching moments upon the airplane, said yieldable connection comprising relatively movable parts and elastic means acting between said parts for urging them into the relative position thereof corresponding with said supported position of the second tab.

8. In combination with an airplane having a control airfoil hinged thereto for providing longitudinal control, first and second tabs each hinged for independent movement to a trailing edge portion of the control airfoil, operating means connected with both tabs for effecting co-directional angular movement of them in either direction for adjusting the longitudinal trim of the airplane, the tabs in the absence of aerodynamic forces thereon being supported at different angles of incidence relative to the control airfoil, the connection between the first tab and said operating means being substantially unyielding, and the connection between the second tab and said operating means being yieldable in only one direction, to enable aerodynamic forces on the second tab to move it angularly from said supported position thereof only in the direction which will lessen the difference between said angles of incidence of the tabs and which by the tab effect on said control airfoil will tend to decrease the negative pitching moments upon the airplane, said yieldable connection comprising relatively movable parts having cooperating stop means and elastic means acting between said parts for urging them into the relative limit position thereof established by the stop means.

9. In combination with an airplane having a control airfoil hinged thereto for providing longitudinal control, first and second tabs each hinged for independent movement to a trailing edge portion of the control airfoil, operating means connected with both tabs for effecting co-directional angular movement of them in either direction for adjusting the longitudinal trim of the airplane, the tabs in the absence of aerodynamic forces thereon being supported at different angles of incidence relative to the control airfoil, the connection between the first tab and said operating means being substantially unyielding, the connection between the second tab and said operating means being yieldable in only one direction, to enable aerodynamic forces on the second tab to move it angularly from said supported position thereof only in the direction which will lessen the difference between said angles of incidence of the tabs and which by the tab effect on said control airfoil will tend to decrease the negative pitching moments upon the airplane, said yieldable connection comprising relatively movable parts having cooperating stop means and elastic means acting between said parts for urging them into the relative limit position thereof established by the stop means, the magnitude of the load applied by said elastic means being such as to prevent said movement of the second tab from said supported position thereof by the aerodynamic forces encountered in the lower part of the airspeed range of the airplane when the longitudinal trim of the airplane is adjusted for an aft center of gravity load distribution and being such as to enable said movement of the second tab by the increasing aerodynamic forces encountered at higher airspeeds under the same condition of longitudinal trim.

10. In combination with an airplane having a control airfoil hinged thereto for providing longitudinal control, first and second tabs each hinged for independent movement to a trailing edge portion of the control airfoil, operating means connected with both tabs for effecting co-directional angular movement of them in either direction for adjusting the longitudinal trim of the airplane, the tabs in the absence of aerodynamic forces thereon being supported at different angles of incidence relative to the control airfoil, the connection between the first tab and said operating means being substantially unyielding, the connection between the second tab and said operating means being yieldable to enable aerodynamic forces on the second tab to move it angularly from said supported position thereof to lessen the difference between said angles of incidence of the tabs and, by the tab effect on said control airfoil, to tend to decrease the negative pitching moments upon the airplane, said yieldable connection comprising relatively movable parts and load applying means comprising a pivoted mass acting between said parts for urging them into the relative position thereof which corresponds with said supported position of the second tab.

11. In combination with an airplane having a control airfoil hinged thereto for providing longitudinal control, first and second tabs each hinged for independent movement to a trailing edge portion of the control airfoil, operating means connected with both tabs for effecting co-directional angular movement of them in either direction for adjusting the longitudinal trim of the airplane, the tabs in the absence of aerodyamic forces thereon being supported at different angles of incidence relative to the control airfoil, the connection between the first tab and said operating means being substantially unyielding, the connection between the second tab and said operating means being yieldable in only one direction, to enable aerodynamic forces on the second tab to move it angularly from said supported position thereof only in the direction which will lessen the difference between said angles of incidence of the tabs and which by the tab effect on said control airfoil will tend to decrease the negative pitching moments upon the airplane, said yieldable connection comprising relatively movable parts having cooperating stop means, and load applying means comprising a pivoted mass acting between said parts for urging them into the relative limit position thereof established by the stop means.

12. In combination with an airplane having a control airfoil hinged thereto for providing longitudinal control, first and second tabs each hinged for independent movement to a trailing edge portion of the control airfoil, operating means connected with both tabs for effecting co-directional angular movement of them in either direction for adjusting the longitudinal trim of the airplane, the tabs in the absence of aerodynamic forces thereon being supported at different angles of incidence relative to the control airfoil, the connection between the first tab and said operating means being substantially unyielding, the connection between the second tab and said operating means being yieldable in only one direction, to enable aerodynamic forces on the second tab to move it angularly from said supported position thereof only in the direction which will lessen the difference between said angles of incidence of the tabs and which by the tab effect on said control airfoil will tend to decrease the negative pitching moments upon the airplane, said yieldable connection comprising relatively movable parts having cooperating stop means, and load applying means comprising a pivoted mass acting between said parts for urging them into the relative limit position thereof established by the stop means, the magnitude of the load applied by said pivoted mass being such as to prevent said movement of the second tab from said supported position thereof by the aerodynamic forces encountered in the lower part of the airspeed range of the airplane when the longitudinal trim of the airplane is adjusted for an aft center of gravity load distribution and being such as to enable said movement of the second tab by the increasing aerodynamic forces encountered at higher airspeeds under the same condition of longitudinal trim.

13. In combination with an airplane having a control airfoil hinged thereto for providing longitudinal control, first and second tabs each hinged for independent movement to a trailing edge portion of the control airfoil, operating means connected with both tabs for effecting co-directional angular movement of them in either direction for adjusting the longitudinal trim of the airplane, the connection between the first tab and said operating means being substantially unyielding, the connection between the second tab and said operating means being yieldable, to enable aerodynamic forces on the second tab to move it angularly, from the position in which it is supported in the absence of such aerodynamic forces, in the direction which by the tab effect on said control airfoil will tend to decrease the negative pitching moments upon the airplane, said yieldable connection comprising relatively movable parts and elastic means acting between said parts for urging them into the relative position thereof which corresponds with said supported position of the second tab.

14. In combination with an airplane having a control airfoil hinged thereto for providing longitudinal control, first and second tabs each hinged for independent movement to a trailing edge portion of the control airfoil, operating means connected with both tabs for effecting co-directional angular movement of them in either direction for adjusting the longitudinal trim of the airplane, the connection between the first tab and said operating means being substantially unyielding, and the connection between the second tab and said operating means being yieldable in only one direction, to enable aerodynamic forces on the second tab to move it angularly, from the position in which it is supported in the absence of such aerodynamic forces, only in the direction which by the tab effect on said control airfoil will tend to decrease the negative pitching moments upon the airplane, said yieldable connection comprising relatively movable parts having cooperating stop means and elastic means acting between said parts for urging them into the relative limit position thereof established by the stop means.

15. In combination with an airplane having a control airfoil hinged thereto for providing longitudinal control, first and second tabs each hinged for independent movement to a trailing edge portion of the control airfoil, operating means connected with both tabs for effecting co-directional angular movement of them in either direction for adjusting the longitudinal trim of the airplane, the connection between the first tab and said operating means being substantially unyielding, the connection between the second tab and said operating means being yieldable in only one direction, to enable aerodynamic forces on the second tab to move it angularly, from the position in which it is supported in the absence of such aerodynamic forces, only in the direction which by the tab effect on said control airfoil will tend to decrease the negative pitching moments upon the airplane, said yieldable connection comprising relatively movable parts having cooperating stop means and elastic means acting between said parts for urging them into the relative limit position thereof established by the stop means, the magnitude of the load applied by said elastic means being such as to prevent said movement of the second tab from said supported position thereof by the aerodynamic forces encountered in the lower part of the airspeed range of the airplane when the longitudinal trim of the airplane is adjusted for an aft center of gravity load distribution and being such as to enable said movement of the second tab by the increasing aerodynamic forces encountered at higher airspeeds under the same condition of longitudinal trim.

16. In combination with an airplane having a control airfoil hinged thereto for providing longitudinal control, first and second tabs each hinged for independent movement to a trailing edge portion of the control airfoil, operating means connected with both tabs for effecting co-directional angular movement of them in either direction for adjusting the longitudinal trim of the airplane, the connection between the first tab and said operating means being substantially unyielding, and the connection between the second tab and said operating means including load applying means arranged to provide for yielding of the connection in only one direction in response to aerodynamic loads applied to said second tab, to enable aerodynamic forces on the second tab to move it angularly, from the position in which it is supported in the absence of such aerodynamic forces, only in the direction which by the tab effect on said control airfoil will tend to decrease the negative pitching moments upon the airplane.

17. In combination with an airplane having a control airfoil hinged thereto for providing longitudinal control, first and second tabs each hinged for independent angular movement to a trailing edge portion of the control airfoil, operating means connected with both tabs for effecting co-directional angular movement of them in either direction for adjusting the longitudinal trim of the airplane, the tabs in the absence of aerodynamic forces thereon being supported at different angles of incidence relative to the control airfoil, the connection between the first tab and said operating means being substantially unyielding, the connection between the second tab and said operating means being yieldable in only one direction in response to loads applied thereto, to enable aerodynamic forces on the second tab to move it angularly from said supported position thereof only in the direction which will lessen the difference between said angles of incidence of the tabs and which by the tab effect on said control airfoil will tend to decrease the negative pitching moments upon the airplane, and means associated with said connection between said operating means and the second tab for lessening the difference between the angles of incidence of the tabs in the supported positions thereof as the control airfoil is moved from its neutral position.

18. In combination with an airplane having a control airfoil hinged thereto for providing longitudinal control, first and second tabs each hinged for independent movement to a trailing edge portion of the control airfoil, operating means connected with both tabs for effecting co-directional angular movement of them in either direction for adjusting the longitudinal trim of the airplane, the tabs in the absence of aerodynamic forces thereon being supported at different angles of incidence relative to the control airfoil, the connection between the first tab and said operating means being substantially unyielding, the connection between the second tab and said operating means being yieldable in only one direction, to enable aerodynamic forces on the second tab to move it angularly from said supported position thereof only in the direction which will lessen the difference between said angles of incidence of the tabs and which by the tab effect on said control airfoil will tend to decrease the negative pitching moments upon the airplane, said yieldable connection comprising relatively movable parts having cooperating stop means and load applying means acting between said parts for urging them into the relative limit position thereof established by the stop means, the magnitude of the load applied by said load applying means being such as to prevent said movement of the second tab from said supported position thereof by the aerodynamic forces encountered in the lower part of the airspeed range of the airplane when the longitudinal trim of the airplane is adjusted for an aft center of gravity load distribution and being such as to enable said movement of the second tab by the increasing aerodynamic forces encountered at higher airspeeds under the same condition of longitudinal trim, and means associated with said connection between said operating means and the second tab for lessening the difference between the angles of incidence of the tabs in the supported positions thereof as the control airfoil is moved from its neutral position.

19. In combination with an airplane having a control airfoil hinged thereto for providing longitudinal control, first and second tabs each hinged for independent movement to a trailing edge portion of the control airfoil, operating means connected with both tabs for effecting co-directional angular movement of them in either direction for adjusting the longitudinal trim of the airplane, the connection of said operating means with the second tab including a play connection providing for limited angular movement of the last-mentioned tab independent of the operating means, and spring means arranged to support the second tab, in the absence of overbalancing aerodynamic forces thereon, in the limit position of its independent angular movement in the direction which, by tab effect on the control airfoil, will tend to increase the negative pitching moments upon the airplane, the magnitude of the load applied by said spring means being such as to prevent angular movement of the tab in the opposite direction by air pressures encountered in the lower part of the airspeed range of the airplane when the longitudinal trim of the airplane is adjusted for an aft center of gravity load distribution and being such as to enable said movement by the such movement of the second tab in the opposite direction by increasing air pressures encountered at higher airspeeds under the same condition of longitudinal trim.

20. In combination with an airplane having a control airfoil hinged thereto for providing longitudinal control, first and second tabs each hinged for independent movement to a trailing edge portion of the control airfoil, operating means connected with both tabs for effecting co-directional angular movement of them in either direction for adjusting the longitudinal trim of the airplane, the connection of said operating means with the second tab including a play connection providing for limited angular movement of the last-mentioned tab independent of the operating means, and load applying means arranged to support the second tab, in the absence of overbalancing aerodynamic forces thereon, in the limit position of its independent angular movement in the direction which, by tab effect on the control airfoil, will tend to increase the negative pitching moments upon the airplane, the magnitude of the load applied by said load applying means being such as to prevent angular movement of the tab in the opposite direction by aerodynamic forces encountered in the lower part of the airspeed range of the airplane when the longitudinal trim of the airplane is adjusted for an aft center of gravity load distribution and being such as to enable such movement of the second tab in said opposite direction by increasing aerodynamic forces encountered at higher airspeeds under the same condition of longitudinal trim.

21. In combination with an airplane having an airfoil hinged thereto for providing longitudinal control, first and second hinged tabs disposed at the trailing edge of said airfoil, said tabs being connected for limited relative angular movement, the connection between the tabs including load applying means arranged to support the second tab, in the absence of aerodynamic forces thereon, angularly displaced relative to the first tab in the direction which, by tab effect on the control airfoil, will tend to increase the negative pitching moments upon the airplane, and longitudinal trim adjusting means comprising operating means connected to said first tab for adjusting its angle of incidence relative to said airfoil, said operating means being effective through said connection between the tabs to adjust said second tab co-directionally with the first tab in either angular direction, the magnitude of the load applied by said load applying means being such as to prevent movement of the second tab, in the direction opposed by said load applying means, by the aerodynamic forces encountered in the lower part of the airspeed range of the airplane when the longitudinal trim of the airplane is adjusted for an aft center of gravity load distribution and being such as to enable said movement of the second tab in said opposed direction by the increasing aerodynamic forces encountered at higher airspeeds under the same condition of longitudinal trim.

22. In combination with an airplane having an airfoil hinged thereto for providing longitudinal control, first and second hinged tabs disposed at the trailing edge of said airfoil, said tabs being connected for limited relative angular movement, the connection between the tabs including elastic means arranged to support the second tab, in the absence of aerodynamic forces thereon, angularly displaced relative to the first tab in the direction which, by tab effect on the control airfoil, will tend to increase the negative pitching moments upon the airplane, and longitudinal trim adjusting means comprising operating means connected to said first tab for adjusting its angle of incidence relative to said airfoil, said operating means being effective through said connection between the tabs to adjust said second tab co-directionally with the first tab in either angular direction, the magnitude of the load applied by said load applying means being such as to prevent movement of the second tab, in the direction opposed by said load applying means, by the aerodynamic forces encountered in the lower part of the airspeed range of the airplane when the longitudinal trim· of the airplane is adjusted for an aft center of gravity load distribution and being such as to enable said movement of the second tab in said opposed direction by the increasing aerodynamic forces encountered at higher airspeeds under the same condition of longitudinal trim.

23. In combination with an airplane having an airfoil hinged thereto for providing longitudinal control, first and second hinged tabs disposed at the trailing edge of said airfoil, said tabs being connected for limited relative angular movement, the connection between the tabs including load applying means in the form of a pivoted mass arranged to support the second tab, in the absense of aerodynamic forces thereon, angularly displaced relative to the first tab in the direction which, by tab effect on the control airfoil, will tend to increase the negative pitching moments upon the airplane, and longitudinal trim adjusting means comprising operating means connected to said first tab for adjusting its angle of incidence relative to said airfoil, said operating means being effective through said connection between the tabs to adjust said second tab co-directionally with the first tab in either angular direction, the magnitude of the load applied by said load applying means being such as to prevent movement of the second tab, in the direction opposed by said load applying means, by the aerodynamic forces encountered in the lower part of the airspeed range of the airplane when the longitudinal trim of the airplane is adjusted for an aft center of· gravity load distribution and being such as to enable said movement of the second tab in said opposed direction by the increasing aerodynamic forces encountered at higher airspeeds under the same condition of longitudinal trim.

ROLAND J. WHITE.

REFERENCES CITED

The following references are of record in the file of this patent:

UNITED STATES PATENTS

| Number | Name | Date |
|---|---|---|
| 1,083,464 | Roche | Jan. 6, 1914 |
| 1,916,475 | Hall | July 4, 1933 |
| 1,974,407 | Barnhart | Sept. 25, 1934 |
| 2,057,877 | Bragunier | Oct. 20, 1936 |
| 2,120,717 | Sikorsky | June 14, 1938 |
| 2,147,638 | De Port | Feb. 21, 1939 |
| 2,277,378 | Wells | Mar. 24, 1942 |
| 2,347,230 | Zuck | Apr. 25, 1944 |
| 2,348,253 | Griswold | May 9, 1944 |
| 2,368,059 | White | Jan. 23, 1945 |
| 2,416,958 | Sears | Mar. 4, 1947 |

FOREIGN PATENTS

| Number | Country | Date |
|---|---|---|
| 418,540 | Great Britain | Oct. 26, 1934 |
| 489,392 | Great Britain | July 26, 1938 |
| 497,969 | Great Britain | Jan. 2, 1939 |
| 542,944 | Great Britain | Feb. 3, 1942 |